US012270946B2

United States Patent
Uyeno et al.

(10) Patent No.: US 12,270,946 B2
(45) Date of Patent: Apr. 8, 2025

(54) OPTICAL SENSOR WITH DUAL-AXIS GIMBALLED TRANSMITTER AND STARING DETECTOR

(71) Applicant: Raytheon Company, Arlington, VA (US)

(72) Inventors: Gerald P. Uyeno, Tucson, AZ (US); Eric Rogala, Tucson, AZ (US); Mark K. Lange, Tucson, AZ (US); Sean D. Keller, Tucson, AZ (US); Vanessa Reyna, Tucson, AZ (US); Benn H. Gleason, Tucson, AZ (US); Craig O. Shott, Benson, AZ (US); Garret A. Odom, Tucson, AZ (US); Jon E. Leigh, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 790 days.

(21) Appl. No.: 17/474,504

(22) Filed: Sep. 14, 2021

(65) Prior Publication Data

US 2024/0402303 A1 Dec. 5, 2024

(51) Int. Cl.
*G01S 7/481* (2006.01)
*F41G 7/22* (2006.01)
*G01S 17/66* (2006.01)

(52) U.S. Cl.
CPC .......... *G01S 7/4817* (2013.01); *F41G 7/2213* (2013.01); *F41G 7/2246* (2013.01); *F41G 7/2293* (2013.01); *G01S 7/4814* (2013.01); *G01S 7/4818* (2013.01); *G01S 17/66* (2013.01)

(58) Field of Classification Search
CPC .... G01S 7/4817; G01S 7/4814; G01S 7/4818; G01S 17/66; F41G 7/2213; F41G 7/2246; F41G 7/2293
See application file for complete search history.

(56) References Cited

U.S. PATENT DOCUMENTS

| | | |
|---|---|---|
| 6,792,028 B2 | 9/2004 | Cook et al. |
| 7,304,296 B2 | 12/2007 | Mills et al. |
| 7,626,152 B2 | 12/2009 | King et al. |
| 9,632,166 B2 | 4/2017 | Trail et al. |
| 10,209,439 B2 | 2/2019 | Keller et al. |

(Continued)

*Primary Examiner* — Jennifer D Bennett
*Assistant Examiner* — Erin R Garber
(74) *Attorney, Agent, or Firm* — Schwegman Lundberg & Woessner, P.A.

(57) ABSTRACT

The design of an existing air-to-air missile seeker is adapted to new missions that require both active laser illumination and detection (passive or active) capabilities. The gimbal is used to point the laser beam to a desired location in a transmit FOR. This approach minimizes the size, weight and power of the sensor because only a small portion of the transmit FOR is illuminated at any instant. This minimizes the laser output required, which reduces the power to operate the laser and the power to maintain the laser at operating temperature. In existing seekers, the gimbal points the detector in the desired direction to expand its FOR. To address the limitations of coupling the laser beam into the gimbaled optical system, the gimbal cannot perform the steering function for the detector. Instead, a staring detector receives light through an off-gimbal aperture within a fixed receive FOR that overlaps the transmit FOR.

20 Claims, 9 Drawing Sheets

(56) References Cited

U.S. PATENT DOCUMENTS

| | | | |
|---|---|---|---|
| 11,644,542 B2* | 5/2023 | Shott | G01S 7/4817 |
| | | | 250/201.1 |
| 2003/0062468 A1 | 4/2003 | Byren et al. | |
| 2019/0011541 A1* | 1/2019 | O'Keeffe | G01S 7/4817 |
| 2019/0084698 A1* | 3/2019 | Leatham | G02B 27/644 |
| 2021/0109197 A1* | 4/2021 | O'Keeffe | G01S 7/4816 |

* cited by examiner

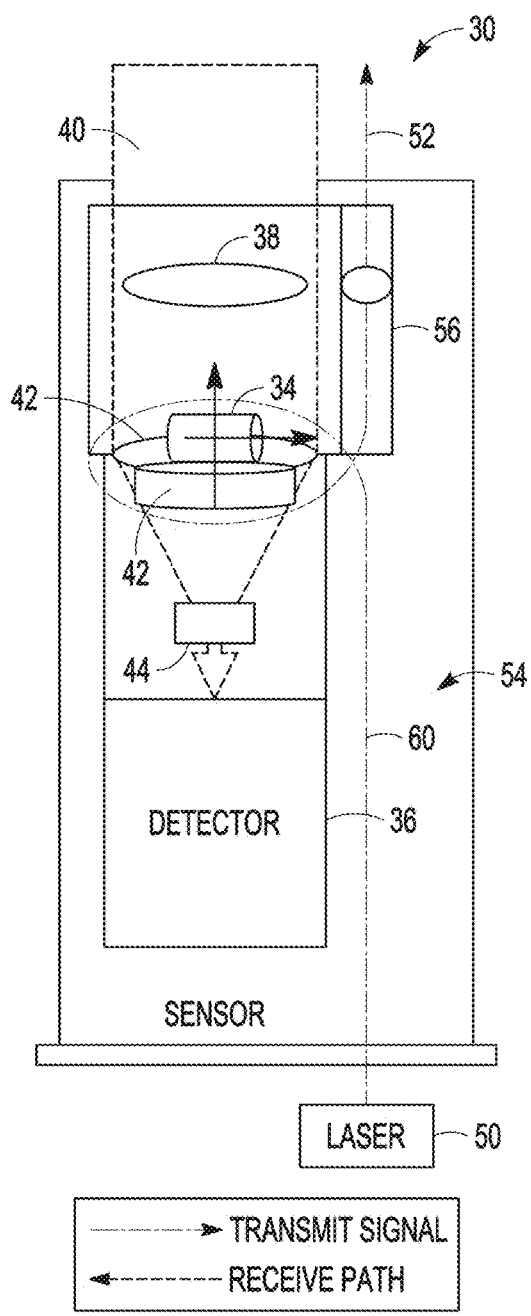
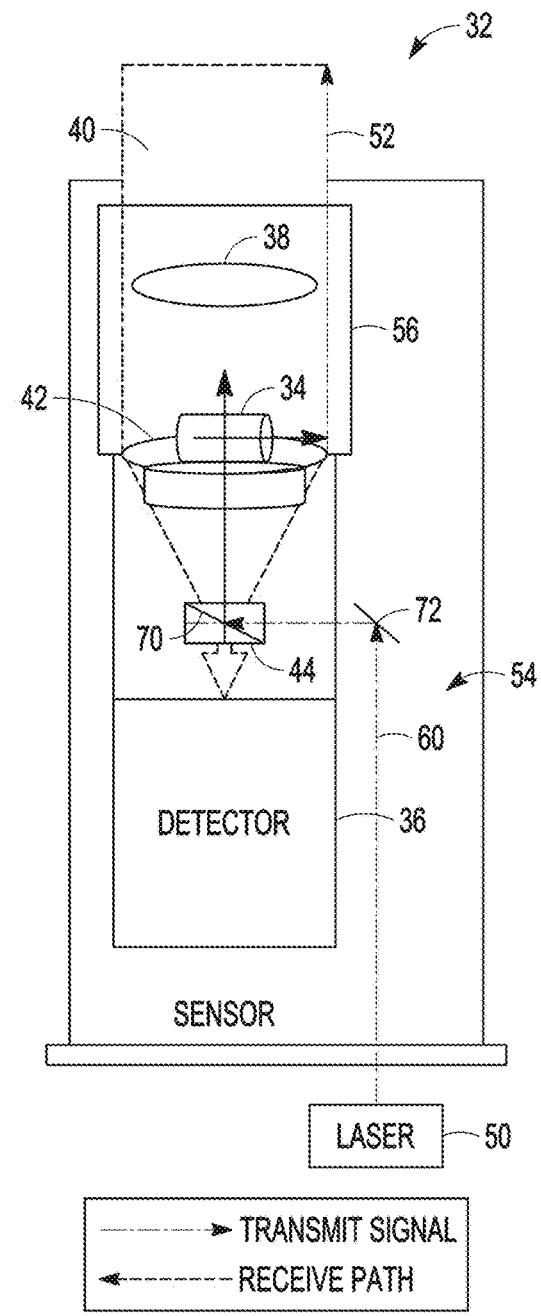
FIG. 2A
(PRIOR ART)
FIG. 2B
(PRIOR ART)

OPTICAL SENSOR WITH DUAL-AXIS GIMBALLED TRANSMITTER AND STARING DETECTOR

BACKGROUND OF THE INVENTION

Field of the Invention

This invention relates to optical sensors that require an active transmit as well as receive (passive or active) capabilities with constrained volume, weight and power.

Description of the Related Art

Gimbaled optical sensors are commonly used as part of guided munitions, aircraft and possibly autonomous vehicles. Passive systems use passive light e.g. infrared (IR) emissions or visible reflections from a target to detect and track the target. Active systems use an on-board source to emit a laser beam. e.g. ultra-violet (UV), IR or visible. The laser beam may be reflected from the target to actively detect and track the target to provide direction, extent, ranging, simple guidance commands to a target centroid or active imaging. The on-board laser may also be used for applications such as communications or other active transmit missions. The passive and active systems are often combined.

Referring now to FIG. 1, a guided munition 10 such as a missile, rocket, projectile etc., is are provided with a gimbaled optical sensor 14. The gimbaled optical sensor directs a laser beam 16 towards a scene 18, which reflects the light to generate a laser return 20 that is collected by the sensor's telescope. Within the sensor's field-of-view (FOV) 22 passive emissions or visible reflections 24 are also collected by the sensor's telescope. The gimbal scans the transmit signal 16 and sensor FOV 22 over a larger field-of-regard 26 to detect a target 28. The laser beam, and thus the returns, may be in the same or different band as the passive emissions. For example, the passive emissions may span a portion of the near infrared (NIR) band and the laser beam could occupy a very narrow band (few nm) around a specific wavelength (s) in the NIR band. Alternately, the passive light may span a portion of the NIR band and the laser beam could occupy a narrow band around a specific wavelengths(s) in the visible band. Other combinations of in and out of band active and passive light will exist. The sensor may be configured to not sense the laser return.

As shown in FIGS. 2A and 2B, typical gimbaled optical sensors 30 and 32 include a dual-axis gimbal 34 that includes an inner (nod) and outer (roll) gimbals positioned behind a protective and optically transparent dome or window. The inner (nod) and outer (roll) gimbals of dual-axis gimbal 34 rotate about inner and outer axes, typically orthogonal to each other, to point an optical axis. An off-gimbal detector 36 is responsive to a band of wavelengths e.g. UV, Visible or IR (SWIR, MWIR, NIR, LWIR, etc.) A telescope 38 mounted on the inner gimbal collects light 40 along the optical axis from the target to form an intermediate image. Gimbal optics 42 propagate the light 40 over the outer (roll) and inner (nod) gimbals along an optical path while preserving image quality. Off-gimbal focus optics 44 relay the intermediate image to the off-gimbal detector 36. In some applications, an Aperture Sharing Element (ASE) is positioned in a receive aperture to separate the incident light into different wavelength bands e.g. UV, Visible and IR and direct the light to different detectors.

The core gimbaled optical sensor to passively detect images was developed as a seeker for an air-to-air missile and has been adapted for different missile, aircraft, autonomous vehicle and other platforms to provide passive detection over a wide field-of-regard (FOR) in IR, Visible and UV bands or a combination thereof. A relatively simple optical system can provide the detector with a FOV of approximately 30×30 degrees. The dual-axis gimbal can scan this fixed FOV over a much larger FOR, typically 360 (roll)×90 (nod) degrees. In most applications, an extended receive FOR is critical to mission success.

To add active illumination capabilities to the seeker, an off-gimbal laser transmitter 50 emits a laser beam 52 in a narrowband around a specified wavelength. The laser is not typically positioned within the sensor volume. Rather it is positioned behind a bulkhead separating the sensor module from the platform. A fiber is run from the laser through the bulkhead into the sensor compartment.

Laser beam 52 is routed along an optical path 54 along the gimbal axes to a transmit telescope 56 mounted on the outer gimbal where it is transmitted toward the target and scanned over the FOR. Transmit telescope 56 may be a common shared telescope with telescope 38 or mounted adjacent and parallel to telescope 38.

As shown in FIG. 2A, sensor 30 connects a fiber 60 to laser transmitter 50, wraps the fiber 60 across the roll and nod gimbals 42 and connects the fiber to transmit telescope 56 to provide optical path 54. See U.S. Pat. No. 7,304,296 entitled "Optical Fiber Assembly Wrapped Across Gimbal Axes". The fiber-wrapped approach has several drawbacks. First, coupling the laser beam from an approximately 1 cm diameter into an approximately 100 micron fiber is inefficient and results in a loss of signal power. Although the fiber can support a fairly wide range of motion, the turret cannot be continuously rotated in "roll". The fiber can be brittle and posses a risk of breaking during operations. Lastly, the fiber is designed for a particular wavelength and thus cannot support multiple diverse wavelengths.

As shown in FIG. 2B, sensor 32 positions an Aperture Sharing Element (ASE) 70 in a common Tx/Rx aperture within focus optics 44 to couple the laser beam 52 from the laser transmitter 50 to either transmit telescope 56 or the common Tx/Rx telescope 38 and to couple the returned transmit signal and the passive emissions from the target to the detector 36. The path from transmit laser 50 to ASE 70 may be free-space (as shown reflected off fold mirror 72) or a fiber pigtail from the laser. See U.S. Pat. Nos. 6,792,028 and 7,626,152 and U.S. Patent Pub. 2003/0062468A1. The primary drawback of this configuration is backscatter of the laser beam from the ASE that tends to distort e.g., clutter or wash out, the image on the detector.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an optical sensor having active illumination and passive detection, and possibly active detection, capabilities with restricted volume, weight and power constraints. A dual-axis gimbal is configured to scan a narrow laser beam over a transmit FOR to provide active illumination. A staring detector senses light through an off-gimbal receiver aperture within a fixed receive FOR that at least partially overlaps the transmit FOR. Using the dual-axis gimbal only to scan the laser beam reduces the required operating power of the laser while avoiding the deficiencies of known systems associated with either fiber or free-space coupling of the laser beam into an existing receiver. To do this, the sensor must either sacrifice receive FOR or use a more complex receive optical system or multiple detectors. This may be achieved by swapping the detector in the original seeker architecture for a laser transmitter (and reconfiguring the focus optics) and providing a separate off-gimbal staring receiver. In certain cases, the transmitter may be positioned within the sensor volume to provide a self-contained modulator optical sensor with active transmit and receive capabilities.

In an embodiment, an optical sensor includes separate active illumination and detection systems. The active illumination system includes a dual-axis gimbal including first and second gimbals that rotate about first and second axes, respectively, to point an optical axis over a transmit field-of-regard (FOR) of at least 5×5 degrees, an off-gimbal laser configured to emit a laser beam (of at most 10 Watts of output power) and a free-space transmit-path optical assembly including coupling optics that couple the laser beam into the optical assembly, gimbal optics that couple the laser beam across the first and second axes to a telescope mounted on the second gimbal to transmit the laser beam along the optical axis in a field-of-view (FOV) of at most 0.1×0.1 degrees (and typically less than 0.02×0.02 degrees) through an on-gimbal transmit aperture. The detection system includes an off-gimbal staring detector, a fixed off-gimbal receive aperture that receives light within a fixed receive FOR of at least 5×5 degrees that overlaps the transmit FOR and a receive-path optical assembly that couples light from the off-gimbal receive aperture to the staring detector. The detection system may or may not be configured to receive active returns from the laser beam.

In an embodiment, the outer gimbal can rotate a full 360 degrees and the inner gimbal can rotate at least 90 degrees to point the laser beam over a transmit FOR of at least 360×90 degrees. A single staring detector will have a receive FOR between 25×25 degrees and 30×30 degrees, typically approximately 30×30 degrees with conventional optics. The received FOR can be increased by using multiple staring detectors or more complex optics such as a hemispherical dome-shaped optical element or multi-directional optics that service a single staring detector.

In different embodiments, the laser beam may be out-of-band so that the staring detector detects only passive emissions/reflected light or in-band so that the staring detector may detect either passive emissions/reflected light or active returns.

In a self-contained modulator unit, all of the components including the dual-axis gimbal, optics, staring detector and laser are included within a defined volume of the modular unit and provided with an interface for connection to a platform (e.g., a missile, manned or unmanned flight vehicle, ship, terrestrial vehicle or fixed platform). The defined volume may a cylindrical volume less than 12" in diameter and 18" in length. In order to package the sensor in such a confined volume, the transmit optical systems are entirely free-space. Either the laser emits the laser beam along the outer gimbal axis into the coupling optics or the laser emits the laser beam perpendicular to the outer gimbal axis, further comprising a turn mirror that redirects the laser beam along the outer gimbal axis into the coupling optics. The laser must be low power, less than 10 W, to accommodate such confined packaging.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2A and 2B, as described above, are schematic diagrams of an optical sensor in which a seeker is provided with active capabilities via a fiber wrapped around the gimbal and a free-space ASE, respectively, to scan both the Tx beam and Rx signal over the FOR;

FIG. 5 is a diagram of a flight vehicle including an optical sensor in which the transmit beam is scanned by a dual-axis gimbal over a transmit FOR and a staring detector receives light in a fixed receive FOR;

FIG. 6 is a diagram of self-contained optical sensor module including multiple staring detectors configured to increase the effective receive FOR;

DETAILED DESCRIPTION OF THE INVENTION

The present invention adapts the air-to-air missile seeker to new missions that require both active laser illumination and detection; passive, active or both. The gimbal is used to point the laser beam to the desired location in the transmit FOR. This approach minimizes the size weight and power of the sensor because only a small portion of the transmit FOR is illuminated at any instant. This minimizes the laser output required, which reduces the power to operate the laser and the power to maintain the laser at operating temperature. In existing seekers, the gimbal points the detector in the desired direction in order to expand its FOR. To address the limitations of coupling the laser beam into the gimbaled optical system, the gimbal cannot perform the steering function for the detector in the present invention. Instead, a staring detector receives light through an off-gimbal aperture within a fixed receive FOR that overlaps the transmit FOR. The receive FOR may be expanded using more complex optical systems or multiple staring detectors. In certain cases, the transmitter may be positioned within the sensor volume to provide a self-contained modular optical sensor with active transmit and receive (passive or active) capabilities. This invention enables the compact, rugged seeker to perform missions that require passive detection and active laser illumination on a wide variety of platforms (e.g., missiles, rockets, guided projectiles, manned or unmanned aircraft, naval vessels, terrestrial vehicles or fixed platforms) in a wide variety of environments.

Figure 1:
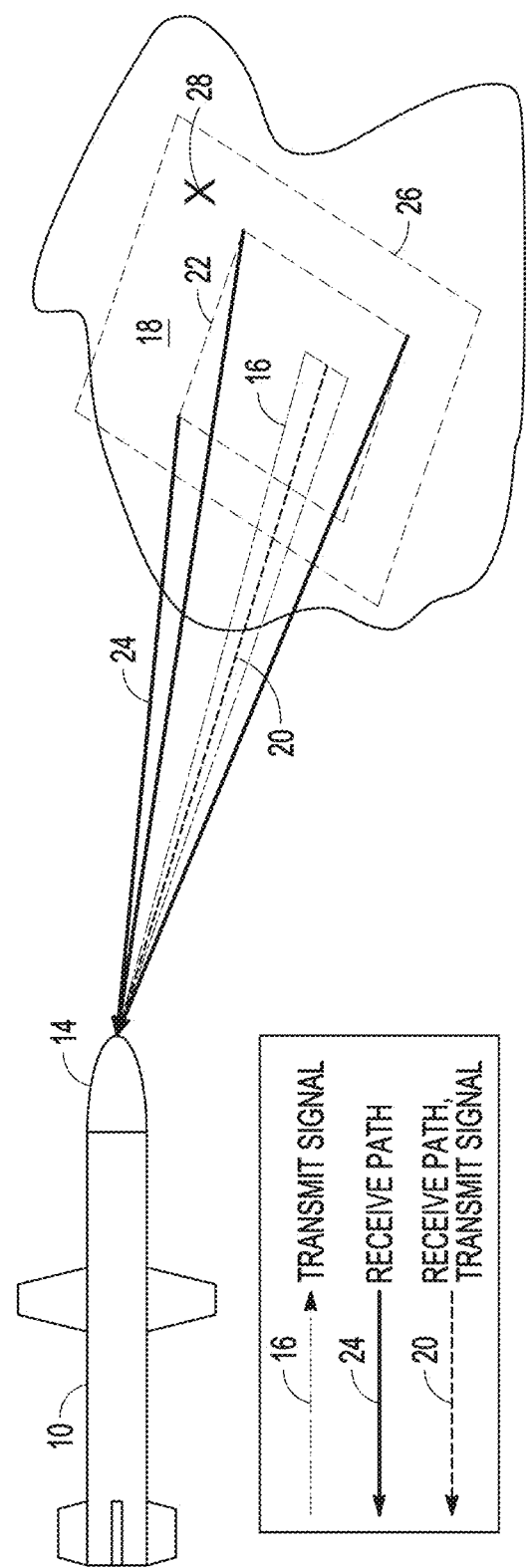
FIG. 1, as described above, is an optical sensor in which both the Tx beam and Rx signal are scanned over a FOR by a dual-axis gimbal.
Figure 3A:
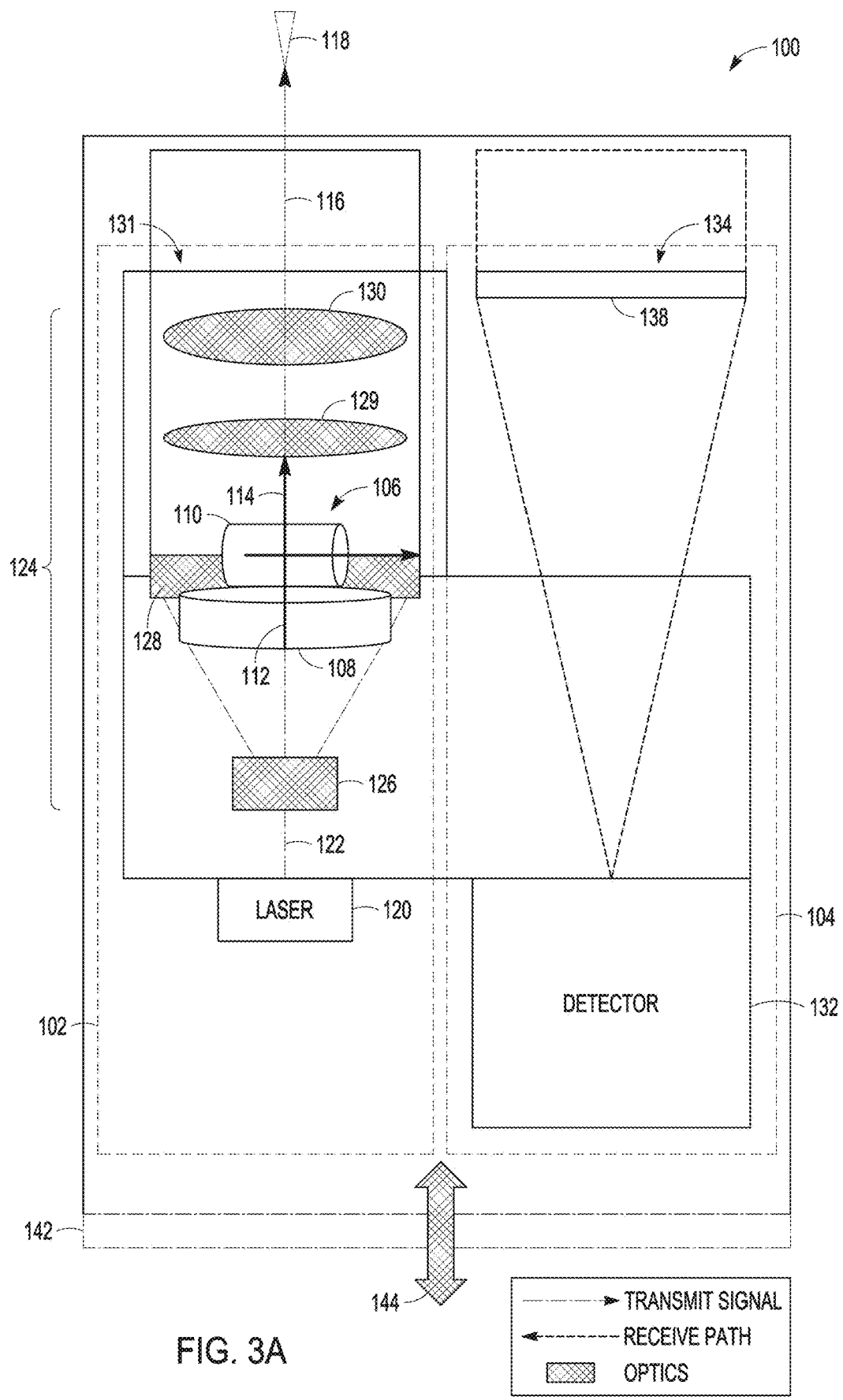
FIGS. 3A and 3B are a schematic diagram of an optical sensor in which the seeker is modified to replace the detector with a transmitter and to provide a staring detector with a separate off-gimbal receiver aperture and the overlapping FOR addressed by the transmitter and staring detector.
Figure 3B:
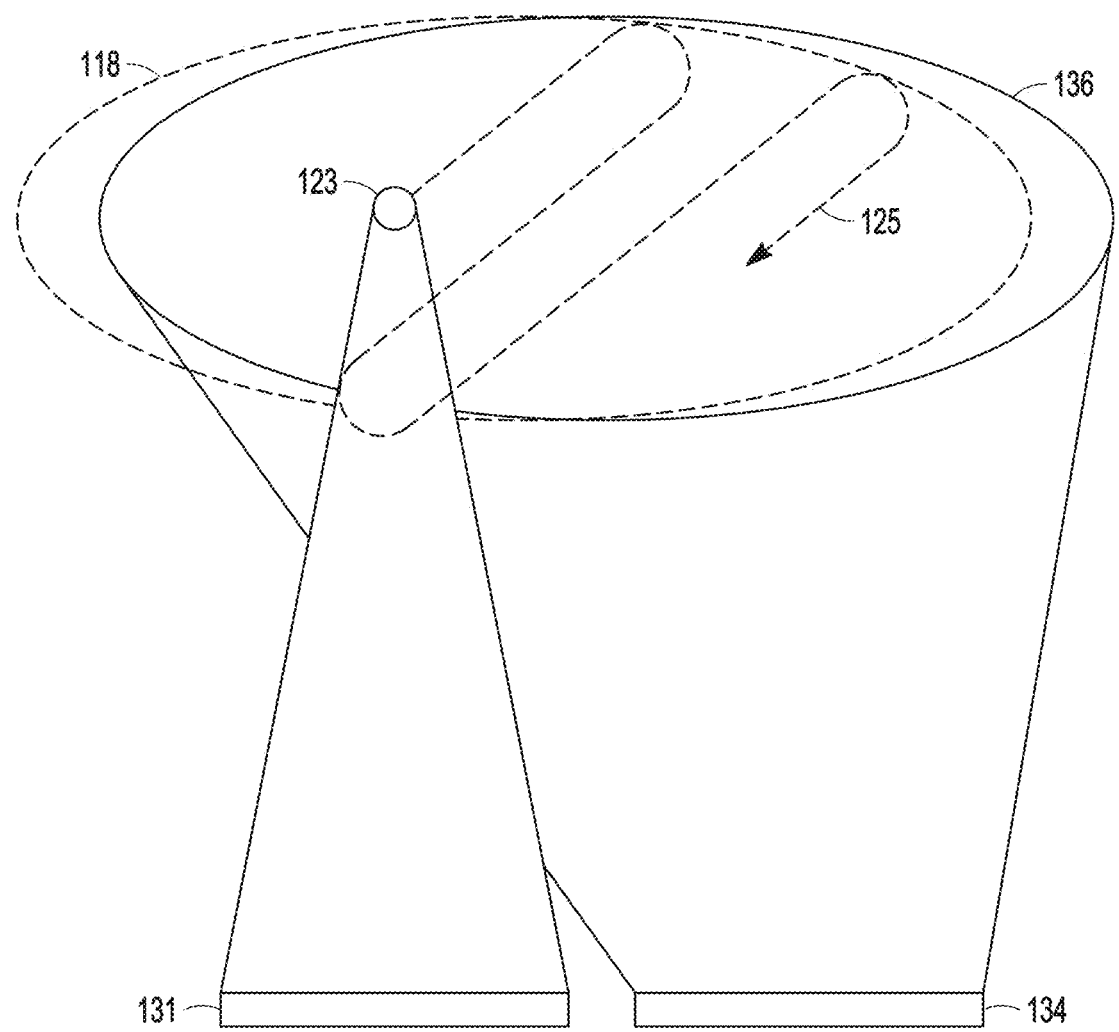

Referring now to FIGS. 3A and 3B, an embodiment of an optical sensor 100 includes separate active illumination and detection systems 102 and 104, respectively. The active illumination system 102 includes a dual-axis gimbal 106 including an outer (roll) gimbal 108 and an inner (nod) gimbal 110 mounted on the outer gimbal that rotate about outer and inner gimbal axes 112 and 114, respectively, to point and scan an optical axis 116 over a transmit field-of-regard (FOR) 118 of at least 5×5 degrees such as measured in Azimuth (Az) and Elevation (El) angles. An off-gimbal laser 120 of at most 10 Watts of power is configured to emit a laser beam 122 in a narrow band around a specified wavelength in the UV, IR or visible spectrum. The laser may emit the laser beam into free-space or a fiber pigtail. A free-space transmit-path optical assembly 124 includes coupling optics 126 that couple the laser beam into the optical assembly, gimbal optics 128 that couple the laser beam across the first and second axes to optics 129 that control the divergence of the laser beam into a telescope 130 mounted on the inner gimbal that collimates and transmits the laser beam along the optical axis 116 in a field-of-view (FOV) 118 of at most 0.1×0.1 degrees (and typically less than 0.02×0.02 degrees) through an on-gimbal transmit aperture 131 into a spot 123 in the far-field and scanned 125 over transmit FOR 118. A low power laser (<10 W of output beam power), must transmit in a very narrow FOV in order to provide sufficient optical power density to its intended target.

The detection system 104 includes an off-gimbal staring detector 132, a fixed off-gimbal receive aperture 134 that receives light within a fixed receive FOR 136 of at least 5×5 degrees that overlaps the transmit FOR 118 and a receive-path optical assembly 138 that couples light from the off-gimbal receive aperture to the staring detector. A simple conventional optical assembly 138 will typically provide a fixed FOV (equal to the FOR 136) of approximately 30×30 degrees. The effective receive FOR may, as will be illustrated later, be increased by using multiple staring detectors or more complex optical systems. The receive FOR 136 may be of the same extent as the transmit FOR 118, partially overlapping or fully included in a larger transmit FOR 118.

The staring detector is configured to detect optical emissions within a spectral band. The laser emits the laser beam within a narrow band about a specified wavelength. The laser wavelength may be "in-band" (within the spectral band of the detector) or "out-of-band (outside the spectral band of the detector). If "in-band", the detector may be configured to detect both passive emissions/reflected light and active returns. If "out of-band" the detector is configured to detect only passive emissions/reflected light. If multiple lasers at different wavelengths are coupled and transmitted via the telescope, one laser or both lasers may be "in-band" and/or "out-of-band."

As shown, optical sensor 100 is configured as a self-contained modular unit 140 that can be mounted on a platform (e.g., a missile, manned or unmanned flight vehicle, ship, terrestrial vehicle or fixed platform) via a bulkhead 142 and an interface (electrical, mechanical, thermal, communications) 144 through the bulkhead. The modular unit will have a defined volume in which all components must reside. The defined volume may a cylindrical volume less than 12" in diameter and 18" in length. In order to package the sensor in such a confined volume, the transmit optical systems are entirely free-space. Either the laser emits the laser beam along the outer (roll) gimbal axis into the coupling optics or the laser emits the laser beam perpendicular to the outer (roll) gimbal axis, further requiring a turn mirror that redirects the laser beam along the outer (roll) gimbal axis into the coupling optics. To accommodate such confined packaging is another reason for requiring a low power laser.

Figure 4:
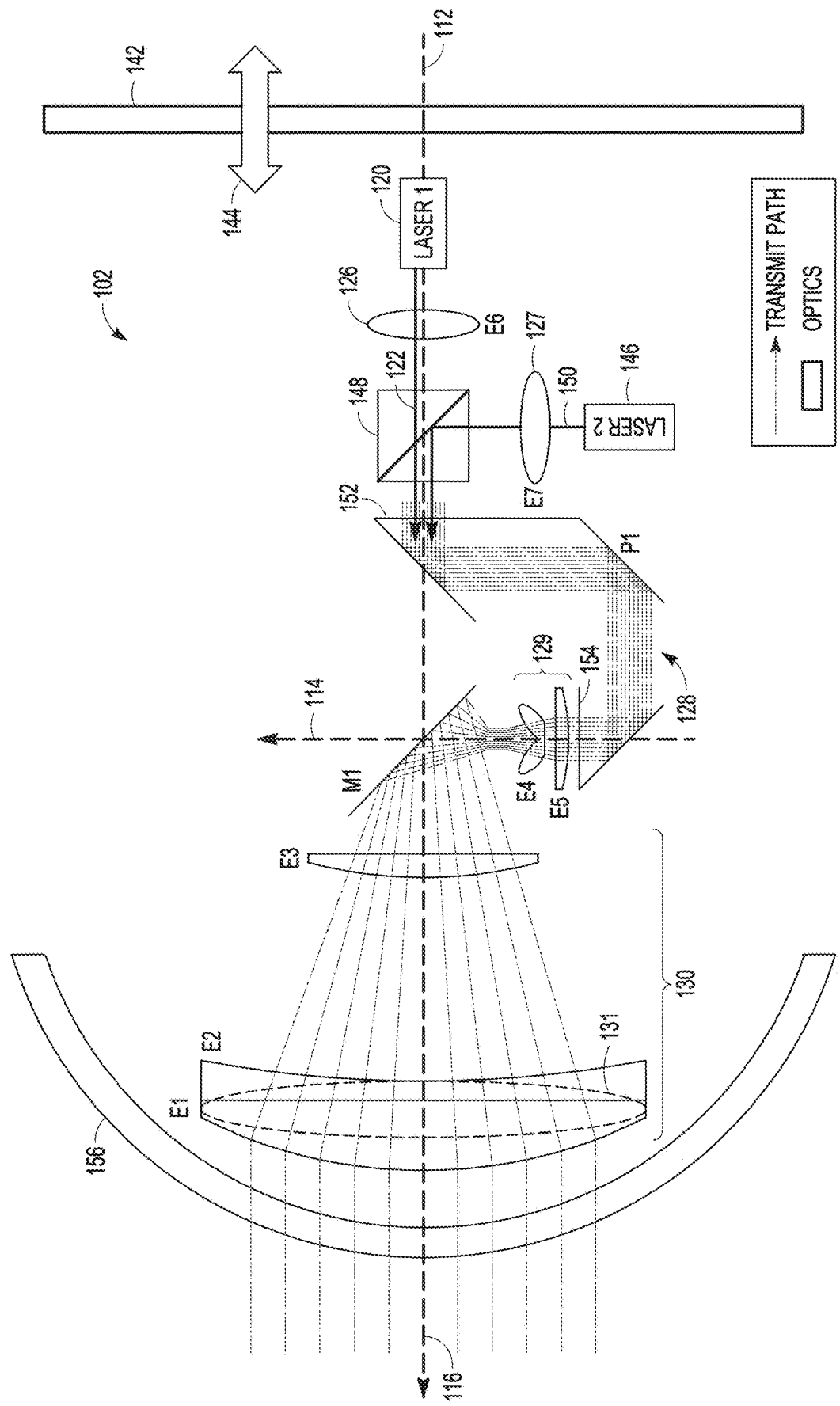
FIG. 4 is a more detailed illustration of the seeker optical system reconfigured for use with one or more transmitters.

Referring now to FIG. 4, in a more detailed illustration of active illumination system 102 in which a pair of lasers 120 and 146 at different wavelengths are configured to steer the laser beam(s) in the narrow FOV over the transmit FOR. Other than the optics to input couple the lasers, in this illustration the remaining optical components are from an embodiment of the original seeker design.

Laser 120 is positioned to emit laser beam 122 along roll axis 112 through optics 126 (lens E6) and through a beam combiner 148. Laser 146 emits a laser beam 150 perpendicular to roll axis 114 through optics 127 (lens E7) into beam combiner 148 that combines beam 150 with beam 122 along roll axis 114. Neither, either one or both laser beams 122 and 150 may lie within the detection band of the staring detector.

Gimbal optics 128 includes a prism P1. The prism P1 receives the collimated laser beams at an input face 152 and routes the beams across the gimbal axes to an output face 154 to allow the system to rotate about the axes without impacting the quality of the beams.

Optics 129 include lens elements E4 and E5 that control the divergence of the laser beams into telescope 130.

Telescope 130 includes a turning mirror M1 that turns the beam along optical axis 116 and lens elements E1, E2 and E3 determine the divergence (e.g., collimate) the laser beams for transmission along the optical axis 116 through an optically transparent dome (or window) 156.

Figure 5:
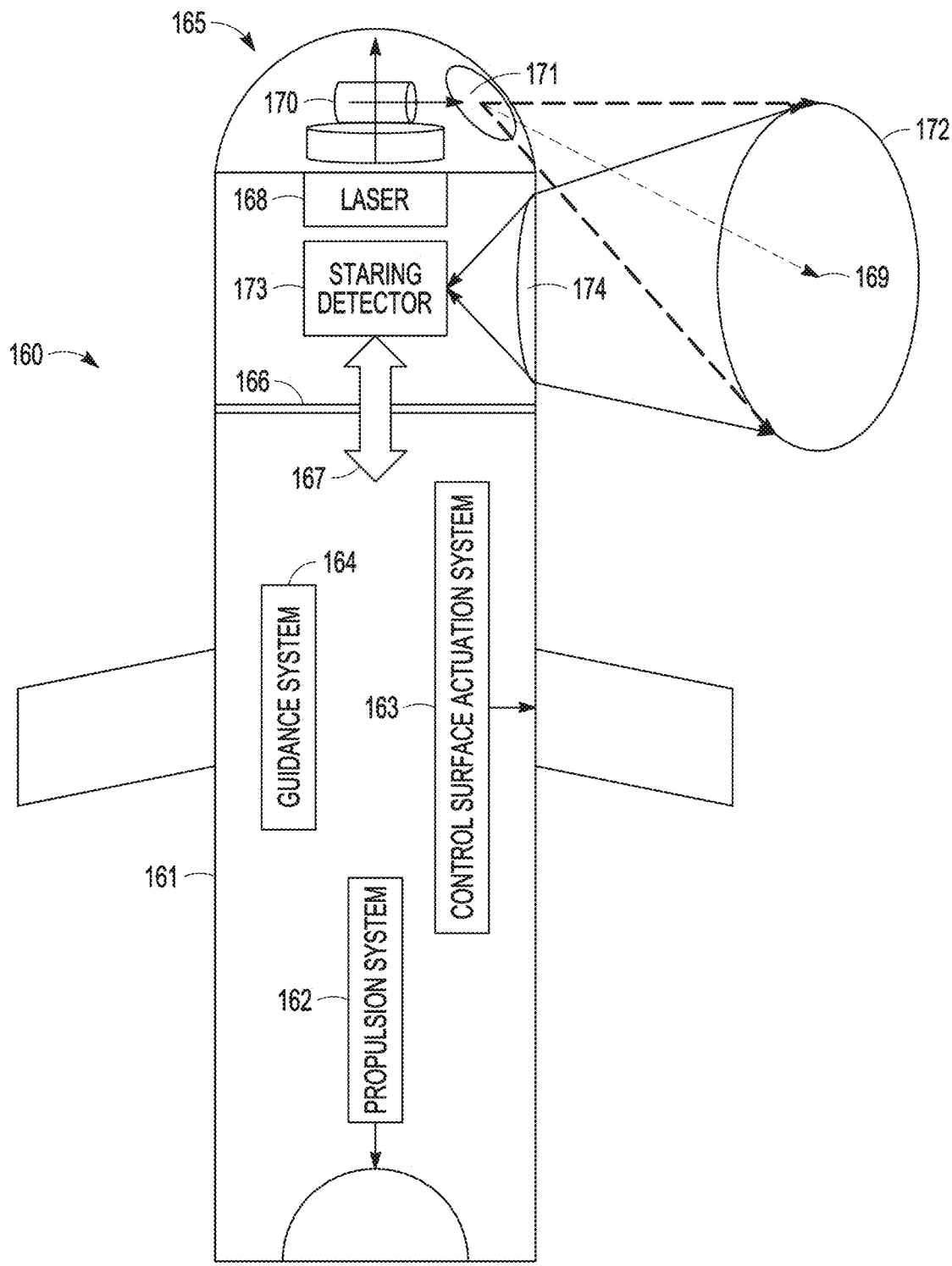

Referring now to FIG. 5, an embodiment of an unmanned flight vehicle 160 includes an airframe 161 including a propulsion system 162, a control surface actuation system 163 and a guidance system 164. A modular optical sensor unit 165 is mounted forward of a bulkhead 166 and includes an interface 167 for all power, electrical, mechanical or other coupling between the unit and the airframe.

In this particular configuration, a laser 168 emits a laser beam 169 that is steered by a dual-axis gimbal 170 and transmitted through a window 171 in a narrow FOV to scan a transmit FOR 172 of approximately 30×30 degrees. A staring detector 173 detects passive emissions/reflected light (and possibly active returns from the laser beam) within a receive FOR that fully overlaps the transmit FOR. This is achieved through an off-gimbal receiver aperture 174 and a conventional optical system.

Figure 6:
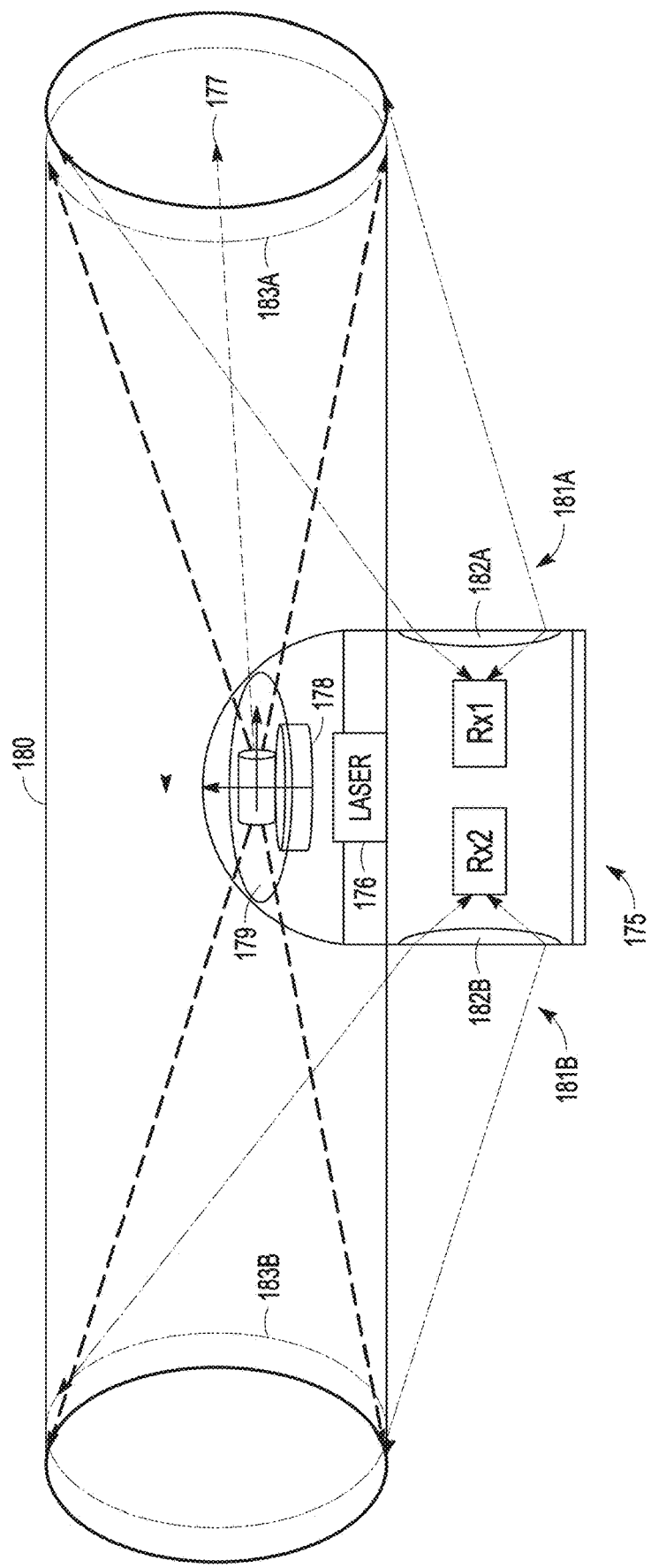

Referring now to FIG. 6, an embodiment of a modular optical sensor unit 175 includes a laser 176 that emits a laser beam 177 that is steered by a dual-axis gimbal 178 and transmitted through a window 179 in a narrow FOV to scan a transmit FOR 180 of approximately 360×90 degrees (roll×nod). A plurality of detection systems 181a, b, . . . including staring detectors (Rx1, Rx2 and fixed optical systems) are positioned to detect light through receive apertures 182a, b, . . . spaced about the circumference of the unit with each system detecting light in a separate receive FOR 183a, b, . . . , each suitably approximate 30×30 degrees, that each overlap a different portion of the transmit FOR 180.

U.S. Pat. No. 10,208,430 "Multi-Directional Optical Receiver and Method" discloses various techniques for expanding the approximately 30×30 degree FOV that conventional optical systems support for a staring detector.

Figure 7:
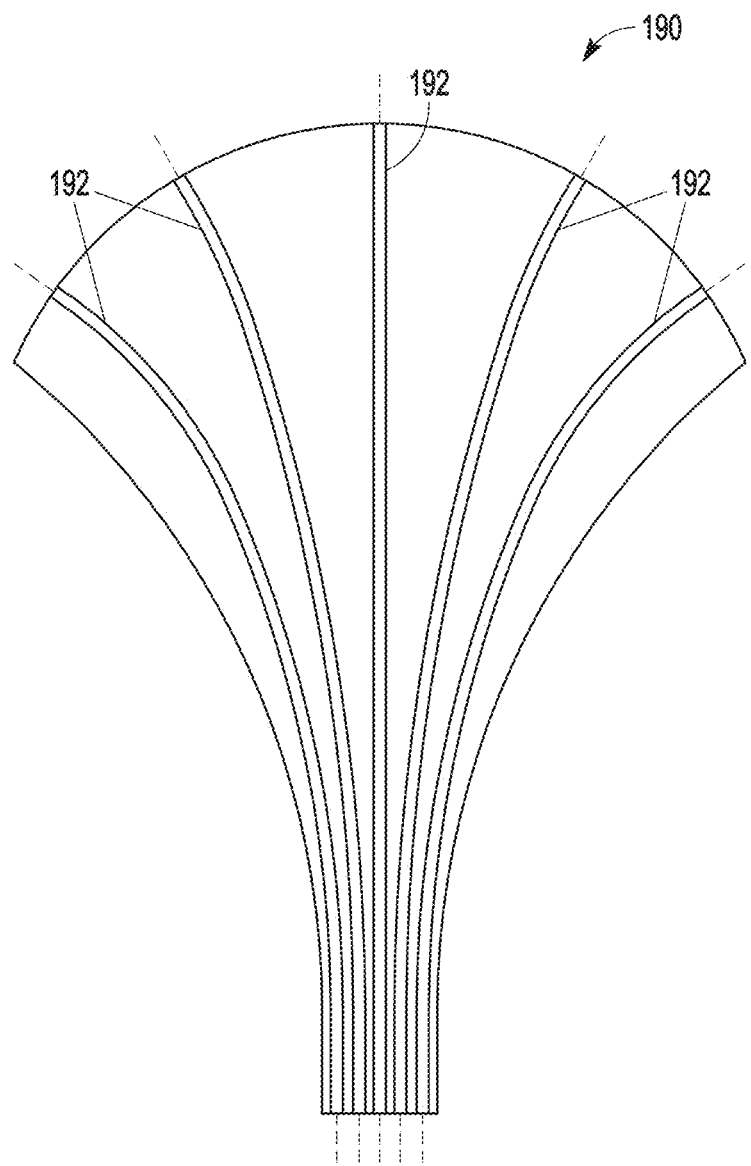
FIG. 7 is a diagram of a conventional hemispherical dome-shaped optical element that can extend the fixed receiver FOR to 180×180 degrees.

One approach to addressing multi-directional collection problems is a hemispherical dome-shaped optical element, such as the example optical element 190 shown in FIG. 7. Optical fibers 192 arranged along the perimeter of the dome-shaped element 190 map received optical radiation to a corresponding staring detector. Specifically, the dome-shaped element 190 allows the associated staring detector to receive optical radiation over a wider field of view than conventional focusing optics, due to the convex profile of the element 190. The FOV may, for example, be a full 360 degrees around the axis and 30 or more degrees perpendicular to the axis (e.g. the axis of symmetry of the dome-shaped element). While increasing the FOV of the receiver 190 when compared to a traditional staring detector, the convex profile of the receiver 190 still restricts the aperture diameter of the receiving system based on the acceptance angle of the fibers 192 in the area normal to the optical surface. Often this limits collection to only a fraction of the total number of optical fibers 192. Further, hemispherical dome-shaped optical receivers may experience relative illumination falloff (RIF) at the extremes of the dome-shaped surface, which can further restrict system performance.

Figure 8:
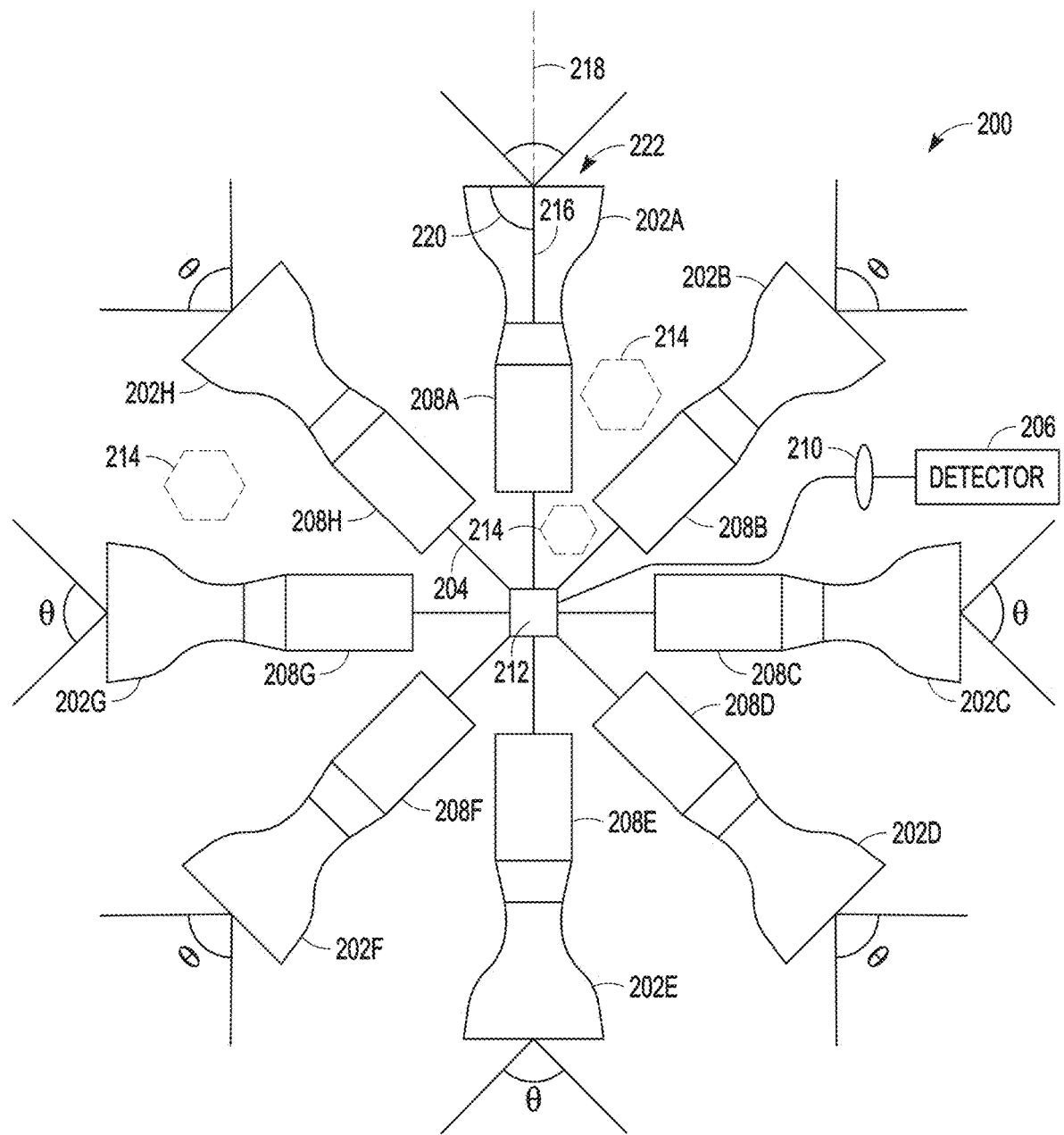
FIG. 8 is a diagram of a known multi-directional optical system that can extend the fixed receiver FOR to 360×30 degrees.

FIG. 8 is an example of an optical receiver 200 according to another approach. Among other components, the optical receiver 200 may include a plurality of fused fiber optic bundles 202 (i.e., fused fiber optic bundles 202a-202h), a fiber optic cable 204, and a single staring detector 206. As shown, the fiber optic cable 204 may be coupled to the staring detector 206 and each of the fused fiber optic bundles 202a-202h. In various embodiments, the optical receiver 200 also includes a plurality of fiber couplings 208 (i.e., fiber couplings 208a-208h), one or more optical elements 210 (e.g., a lens), and a fiber optic combiner or switch 212. As shown, each of the fused fiber optic bundles 202a-202h may terminate at a corresponding fiber coupling 208. The fiber couplings 208a-208h may be interposed between individual fused fiber optic bundles 202a-202h and the fiber optic cable 204. The one or more optical elements 210 are positioned to receive and focus optical radiation collected by the fused fiber optic bundles 202a-202h onto the staring detector 206.

In various embodiments, each of the fused fiber optic bundles 202a-202h of the optical receiver 200 is positioned to directly collect optical radiation from a scene. In contrast to various data transmission techniques which may utilize optical fibers to send and receive information, various examples of the fused fiber optic bundles 202a-202h discussed herein may each include one or more optical fiber (e.g., optical fiber 216) positioned to collect optical radiation. In one implementation, each of the fused fiber optic bundles 202a-202h may include numerous individual optical fibers, such as non-imaging optical fibers, fused together during a manufacturing process. For instance, the bundle 200a may include over a million fused optical fibers. In certain embodiments, the fused fiber optic bundles 202a-202h may include numerous unordered non-imaging optical fibers.

Individual optical fibers (e.g., optical fiber 216) of each of the fused fiber optic bundles 202a-202h may be rigid or flexible and may be constructed from glass or any other suitable material. In one example, individual optical fibers may be constructed from an infrared transmitting plastic. Such a material may be advantageous in certain implementations to further reduce the weight of the optical receiver 200 and allow the optical fibers to be included within a structure used as cladding for the fused fiber optic bundles 202a-202h. In various embodiments, the type of optical fiber chosen depends on the wavelength of the optical radiation collected. In particular, each optical fiber of a corresponding fiber optic bundle may be transmissive to the propagating wavelength of collected optical radiation, and may be coated with an anti-reflection coating to maximize efficiency and decrease noise.

In certain embodiments, one or more of the fused fiber optic bundles 202a-202h is a broadband fused fiber optic bundle configured to collect polychromatic incident optical radiation. In such an embodiment, the optical receiver 200 may further include one or more wavelength splitting optics configured to split the polychromatic optical radiation based on wavelength, and map each wavelength to a corresponding portion of the staring detector 206. In certain other examples, the staring detector 206 may include a color filter array, such as a Bayer filter, positioned proximate the staring detector 206 configured to filter the polychromatic optical radiation at the staring detector 206.

In similar arrangements, one or more of the fused fiber optic bundles 202a-202h may be a polarized fused fiber bundle having a polarized coating on a receiving surface thereof. For example, the polarized coating may enable collection of a single polarization of optical radiation. In such an embodiment, the optical receiver 200 may further include a polarization filter and/or a micro-grid polarizer proximate the staring detector 206. In one particular implementation, different optical fibers (e.g., optical fiber 216) within one or more of the fused fiber bundles 202a-202h may be arranged to accept polarized light at different angles. Optical radiation corresponding to a first polarization may be split from optical radiation corresponding to a second polarization with a Digital Mirror Device (DMD), which may direct the optical radiation to corresponding portions of the staring detector.

In certain embodiments, each of the fused fiber optic bundles 202a-202h may be a fiber taper. Each fiber taper may define a magnification ratio to expand or reduce the collected optical radiation to a suitable magnification level. For instance, each fiber taper may minify a spot size of collected optical radiation to enable collection at the respective fiber coupling 208a-208h and transmission on the fiber optic cable 204. While in one implementation, each fiber taper may have a magnification ratio of 5:1, in various other implementations the magnification ratio may depend on the particular application. For instance, the magnification ratio of each fiber taper may depend on the number of additional fused fiber tapers within the optical receiver 200.

Each optical fiber (e.g., optical fiber 216) of a fused fiber optic bundle 202 runs from a receiving surface of the corresponding fused fiber bundle, to a corresponding one of the fiber couplings 208a-208h. As shown, each receiving surface may include a substantially planar receiving surface, such as substantially planar receiving surface 222. A first end of each optical fiber included within a respective fused fiber bundle, and a fiber axis (e.g., fiber axis 218) of that respective fused fiber bundle, is positioned at an angle (e.g., angle 220) perpendicular to the substantially planar surface to collect incident optical radiation along the fiber axis. However, in various other examples, the substantially planar receiving surface may be oriented such that the angle (e.g., angle 220) relative to the fiber axis is non-perpendicular, and positioned at a tilted angle (e.g., less than 90 degrees). Such an implementation would permit the fused fiber optic bundle 202 to receive optical radiation along the fiber axis while being positioned to match the contour of a mounting surface.

Accordingly, each optical fiber within a fused fiber optic bundle has a field of view that, when combined with the field of view of the other fibers of that bundle increases the numerical aperture of the fused fiber optic bundle. The field of views of the fused fiber optic bundles 202a-202h are illustrated by angular range THETA. While in one example, each of the fused fiber optic bundles 202a-202h may have a similar field of view (e.g., 45 degrees), in various other examples, only a portion of the fused fiber optic bundles 202a-202h may share the same field of view, or each of the fused fiber optic bundles 202a-202h may have a different field of view. In the shown example, a second end of the optical fibers of each of the fused fiber optic bundles 202a-202h terminates at the corresponding fiber coupling 208a-208h.

In various embodiments, each of the fused fiber optic bundles 202a-202h may be positioned in a different direction relative to each of the other fused fiber optic bundles 202a-202h. That is, each fused fiber optic bundle may be spaced apart relative to another fused fiber optic bundle in at least one of an x-direction, y-direction, and z-direction, of a Cartesian coordinate system. In further embodiments, the fused fiber optic bundles 202a-202h spaced apart in a single horizontal plane for the convenience of illustration or each fused fiber optic bundle may be similarly positioned in more than one plane, such as the x-direction and the y-direction, the x-direction and the z-direction, and the z-direction and the y-direction. In certain further embodiments, each fused fiber optic bundle may be positioned within the x-direction, the y-direction, and the z-direction, to achieve a full isotropic field of view.

In certain embodiments, the number of fused fiber optic bundles 202a-202h included in the receiver 200, and the field of view of each of the fused fiber optic bundles 202a-202h, may be chosen to achieve an omnidirectional FOV for the staring detector 206. As discussed herein, an omnidirectional FOV may include a FOV that receives optical radiation substantially uniformly in all directions within a given plane (i.e., receives radiation uniformly within the x-direction, the y-direction, or the z-direction, of the Cartesian coordinate system). For example, the optical receiver 200 may include ten fused fiber optic bundles each having a FOV of substantially 36 degrees. Such an arrangement would define a 360 degree field of view for the staring detector 206. In another example, the optical receiver 200 may include eight fused fiber optic bundles each having a FOV of substantially 45 degrees. In various other implementations, other arrangements of fused fiber optic bundles 202a-202h may be positioned to collectively achieve a substantially 360 degree field of view.

While in at least one example, each of the fused fiber optic bundles 202a-202h may have a substantially uniform field of view, in various other implementations one or more of the fused fiber optic bundles 202a-202h may have a non-uniform field of view. For instance, one or more of the fused fiber bundles 202a-202h may be defined by a substantially non-symmetrical diameter, such as a non-circular diameter. In one example, the diameter of a fused fiber bundle may be substantially rectangular or substantially triangular. Such non-symmetrical arrangements may achieve a non-omnidirectional multi-directional FOV, such as non-circular FOV.

In other arrangements, the fused fiber optic bundles 202a-202h of the optical receiver 200 may be positioned to provide a multi-directional FOV of the staring detector 206 despite the presence of one or more objects that would otherwise obstruct the optical layout of a conventional optical receiver. Specifically, one or more of the fused fiber optic bundles 202a-202h may be positioned such that the location of the fused fiber optic bundle avoids obstructing object within the presence of the optical receiver or an associated system. For example, fused fiber optic bundles 202a, 202b, 202g, 202h may be positioned such that obstructing objects 214 are outside a field of thereof. In other arrangements, the fused fiber optic bundles 202a-202h may be positioned to achieve a desired FOV while avoiding items that would otherwise break a line of sight of the optical receiver 200. In such an arrangement, fused fiber optic bundles 202a-202h may be symmetrically, non-symmetrically, or arbitrarily positioned to achieve the desired FOV while avoiding other structural and internal components of the optical receiver 200 and/or an associated optical system.

Optical radiation collected by one or more of the fused fiber optic bundles 202a-202h is received by the corresponding fiber coupling 208a-208h at the terminating end of the respective fused fiber optic bundle 202. The one or more fiber couplings 208a-208h may each include a series of inputs and outputs configured to receive the collected optical radiation and propagate the collected optical radiation to the fiber optic cable 204. For example, the fiber couplings 208a-208h may each include a multi-mode fiber coupling having multiple inputs configured to combine the collected optical radiation to a single output. In certain examples, each of the fiber couplings 208a-208h may include a micro-lens array. In particular, the fiber couplings 208a-208h may include a high numerical aperture microlens array having dimensions to match a terminating end of the corresponding fused fiber bundle 202a-202h. The fiber couplings 208a-208h may further include focusing optics, such as one or more collimator, to focus the optical radiation onto the fiber optic cable 204.

In various embodiments, the fiber optic cable 204 is coupled to each of the fused fiber optic bundles 202a-202h by the fiber couplings 208a-208h. The fiber optic cable 204 is configured to receive and propagate the collected optical radiation from the fused fiber optic bundles 202 to the single staring detector 206. As discussed herein, the plurality of fused fiber optic bundles 202a-202h routed to the single staring detector 206 by the fiber optic cable 204 define a substantially omnidirectional field of view of the staring detector 206. In one example, the fiber optic cable 204 is a multi-mode fiber optic cable fused into a single optical fiber for efficiently propagating collected optical radiation to the staring detector 206. In various embodiments, the collected optical radiation may include collected short-wavelength infrared (SWIR) radiation reflected from the scene. However, in various other implementations the optical radiation may include light of other wavelengths within the electromagnetic spectrum, such as near-infrared radiation (NIR), mid-wavelength infrared (MWIR), long-wavelength infrared (LWIR), or visible light.

Collected optical radiation propagates along the length of the fiber optic cable 204 and is received at the single staring detector 206. As shown, the optical element 210 may be positioned to focus the collected optical radiation onto one or more individual unit cells of the staring detector 206. The optical element 210 may include a single lens or mirror or a combination of lenses or mirrors For example, the optical element 210 may be a singlet lens.

In various embodiments, the staring detector 206 includes a photodetector having a spectral band chosen to match a wavelength of the collected optical radiation. The staring detector 206 may include a Focal Plane Array (FPA) positioned at a focal plane of the optical receiver 200, and including a plurality of photo-sensitive unit cells (i.e., "pixels") each configured to individually receive the collected optical radiation. When activated, individual unit cells within the FPA integrate photons of radiation impinging on the unit cell. A circuit within each unit cell of the FPA accumulates charge corresponding to the incident radiation.

At the end of an integration period, the unit cells may be deactivated, and a read-out value corresponding to the accumulated charge may be provided. In various embodiments, the FPA may include a reduced number of unit cells, such as a single linear array of unit cells (i.e., a single row or column of unit cells). In other embodiments, the staring detector may include a single unit cell. Unit cells may include complementary metal-oxide semiconductor (CMOS) sensors or charge coupled devices (CCD).

As FIG. 8 shows, in at least one example the optical receiver 200 may include a fiber optic switch 212, or other fiber optic combiner, coupled to the fiber optic cable 204. The fiber optic switch 212 is configured to selectively control the propagation of the collected optical radiation to the staring detector 206. Specifically, the fiber optic switch 212 may be configured to selectively control propagation from the fused fiber bundles 202a-202h to unit cells of a single linear array of unit cells, or a single unit cell, of the staring detector 206. While the fiber optic switch 212 is shown in FIG. 8 as a single fiber optic switch for the convenience of illustration, in various other implementations the fiber optic switch may be composed of an plurality of fiber optic switches (or combiners), each switch coupled to a fiber bundle of the fused fiber bundles 202a-202h.

In such an implementation, the fiber optic switch 212 allows unit cells of the staring detector 206 to be switched to receive optical radiation from the various fused fiber optic bundles 202a-202h of the optical receiver 200. The fiber optic switch 212 may include mechanical switches, electro-optic switches, micro-electro-mechanical switches (MEMS), magneto-optic switches, or acoustic-optic switches, to name a few examples. The fiber optic switch 212 of various embodiments may include a plurality of inputs coupled to each of the fiber couplings 208a-208h via the fiber optic cable 204, each input capable of disengaging with a given fiber coupling. For example, the fiber optic switch 212 may engage with only those fiber optic couplings corresponding to fused fiber optic bundles currently receiving radiation. As the fused fiber optic bundles currently receiving radiation may change as the receiver 200 moves, or the area of the scene viewed changes, the fiber optic switch 212 may rapidly engage and disengage with any of the fiber optic couplings 208a-208h.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
   a dual-axis gimbal including an outer gimbal and an inner gimbal mounted on the outer gimbal that rotate about outer and inner gimbal axes, respectively, to point an optical axis over a transmit field-of-regard (FOR) of at least 5×5 degrees;
   an off-gimbal laser configured to emit a laser beam of at most 10 Watts of output power;
   a free-space transmit-path optical assembly including coupling optics that couple the laser beam into the free-space transmit-path optical assembly, gimbal optics that couple the laser beam across the outer and inner gimbal axes to a telescope mounted on the inner gimbal to transmit the laser beam along the optical axis in a field-of-view (FOV) of at most 0.1×0.1 degrees through an on-gimbal transmit aperture;
   an off-gimbal staring detector;
   a fixed off-gimbal receive aperture that receives light within a fixed receive FOR of at least 5×5 degrees that overlaps the transmit FOR; and
   a receive-path optical assembly that couples light from the off-gimbal receive aperture to the off-gimbal staring detector.

2. The optical sensor of claim 1, wherein the outer gimbal can rotate a full 360 degrees and the inner gimbal can rotate at least 90 degrees.

3. The optical sensor of claim 2, wherein the fixed receive FOR is between 25×25 degrees and 35×35 degrees.

4. The optical sensor of claim 2, wherein the receive-path optical assembly comprises a plurality of optical fibers arranged along a perimeter of a dome-shaped element to provide a hemispheric receive FOR.

5. The optical sensor of claim 2, wherein the receive-path optical assembly comprises a plurality of fused fiber optic bundles, each fused fiber optic bundle including a bundle of unordered non-imaging optical fibers and being positioned to directly collect optical radiation from a scene at a corresponding planar receiving surface thereof, at least a first fused fiber optic bundle of the plurality of fused fiber optic bundles including a polarized coating on the corresponding planar receiving surface thereof; a multi-mode fiber optic cable coupled to each fused fiber optic bundle of the plurality of fused fiber optic bundles, the multi-mode fiber optic cable configured to propagate the collected optical radiation from each of the plurality of fused fiber optic bundles along a length of the multi-mode fiber optic cable; said off-gimbal staring detector having at least one unit cell, the off-gimbal staring detector coupled to the multi-mode fiber optic cable and configured to receive the collected optical radiation from the plurality of fused fiber optics bundles via the multi-mode fiber optic cable, wherein in combination a field of view of each fused fiber optic bundle of the plurality of fused fiber optic bundles collectively defines an omnidirectional receive FOR of the off-gimbal staring detector; and a fiber optic switch coupled to the multi-mode fiber optic cable, the fiber optic switch being configured to selectively control propagation of the collected optical radiation to the at least one unit cell of the off-gimbal staring detector.

6. The optical sensor of claim 2, further comprising a second off-gimbal staring detector, a second fixed off-gimbal receive aperture that receives light within a second fixed receive FOR of at least 5×5 degrees that overlaps the transmit FOR.

7. The optical sensor of claim 1, wherein the off-gimbal laser emits the laser beam along the outer gimbal axis into the coupling optics.

8. The optical sensor of claim 1, wherein the off-gimbal laser emits the laser beam perpendicular to the outer gimbal axis, further comprising a turn mirror that redirects the laser beam along the outer gimbal axis into the coupling optics.

9. The optical sensor of claim 1, further comprising a second laser configured to emit a second laser beam at a different wavelength than the laser beam, said second laser beam coupled into the free-space transmit-path optical assembly and transmitted along the optical axis.

10. The optical sensor of claim 9, wherein the off-gimbal laser emits the laser beam along the outer gimbal axis through first coupling optics and a beam combiner, wherein the second laser emits the second laser beam perpendicular to the outer gimbal axis through second coupling optics to the beam combiner that redirects the second laser beam along the outer gimbal axis.

11. The optical sensor of claim 1, wherein the gimbal optics comprise a prism that couples the laser beam across the outer and inner gimbal axes while the outer or inner gimbals rotate, further comprising lens elements E4 and E5 that control a divergence of the laser beam, and wherein the telescope comprises a turning mirror M1 and lens elements E1, E2 and E3 that collimate the laser beam for transmission along the optical axis.

12. The optical sensor of claim 1, wherein the optical sensor is contained within a cylindrical volume having a diameter of 12" or less and a length of 18" or less.

13. The optical sensor of claim 1, wherein the optical sensor is a modular sensor unit further comprising an interface for connection to a mounting platform.

14. The optical sensor of claim 1, wherein the FOV of the laser beam is less than 0.02×0.02 degrees.

15. The optical sensor of claim 1, wherein the off-gimbal staring detector detects light within a spectral band, wherein the laser beam is emitted in a band around a specified wavelength that lies outside the detector's spectral band.

16. The optical sensor of claim 1, wherein the off-gimbal staring detector detects light within a spectral band, wherein the laser beam is emitted in a band around a specified wavelength that lies within the detector's spectral band.

17. An optical sensor, comprising:
a dual-axis gimbal including an outer gimbal and an inner gimbal mounted on the outer gimbal that rotate about outer and inner gimbal axes, respectively, to point an optical axis over a transmit field-of-regard (FOR) of at least 5×5 degrees;
an off-gimbal laser configured to emit a laser beam of at most 10 Watts of output power; in a narrowband about a specified wavelength;
a free-space transmit-path optical assembly including coupling optics that couple the laser beam into the free-space transmit-path optical assembly, gimbal optics that couple the laser beam across the outer and inner gimbal axes to a telescope mounted on the inner gimbal to transmit the laser beam along the optical axis in a field-of-view (FOV) of at most 0.1×0.1 degrees through an on-gimbal transmit aperture;
an off-gimbal staring detector that detects light in a spectral band that does not overlap the laser beam's narrow band about the specified wavelength;
a fixed off-gimbal receive aperture that receives light within a fixed receive FOR of at least 5×5 degrees that overlaps the transmit FOR; and
a receive-path optical assembly that couples light from the off-gimbal receive aperture to the off-gimbal staring detector.

18. The optical sensor of claim 17, further comprising a second laser configured to emit a second laser beam at a narrow band about a specified wavelength that is a different wavelength than that of the laser beam and lies within the detector's spectral band, said second laser beam being coupled into the free-space transmit-path optical assembly and transmitted along the optical axis to illuminate and active image a target.

19. A self-contained optical sensor module, said comprising:
a cylindrical volume less than 12" in diameter and 18" length,
a dual-axis gimbal including an outer gimbal and an inner gimbal mounted on the outer gimbal that rotate about outer and inner gimbal axes, respectively, to point an optical axis over a transmit field-of-regard (FOR) of at least 5×5 degrees;
an off-gimbal laser of at most 10 Watts of power configured to emit a laser beam into free-space;
a free-space transmit-path optical assembly including coupling optics that couple the laser beam into the free-space transmit-path optical assembly, gimbal optics that couple the laser beam across the outer and inner gimbal axes to a telescope mounted on the inner gimbal to transmit the laser beam along the optical axis in a field-of-view (FOV) of at most 0.1×0.1 degrees through an on-gimbal transmit aperture;
an off-gimbal staring detector;
a fixed off-gimbal receive aperture that receives light within a fixed receive FOR of at least 5×5 degrees that overlaps the transmit FOR;
a receive-path optical assembly that couples light from the off-gimbal receive aperture to the off-gimbal staring detector; and
an interface for coupling to a sensor mounting platform.

20. The self-contained optical sensor module of claim 19, wherein either the off-gimbal laser emits the laser beam along the outer gimbal axis into the coupling optics or the off-gimbal laser emits the laser beam perpendicular to the outer gimbal axis, further comprising a turn mirror that redirects the laser beam along the outer gimbal axis into the coupling optics.

* * * * *